US012669282B2

(12) United States Patent
Sellers et al.

(10) Patent No.: US 12,669,282 B2
(45) Date of Patent: *Jun. 30, 2026

(54) REFRIGERATOR APPLIANCE AND ASSEMBLY FOR CODE READING

(71) Applicant: Haier US Appliance Solutions, Inc., Wilmington, DE (US)

(72) Inventors: Robert Alan Sellers, Louisville, KY (US); Timothy Ray Jackson, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/438,986

(22) Filed: Feb. 12, 2024

(65) Prior Publication Data

US 2025/0257936 A1 Aug. 14, 2025

(51) Int. Cl.
| *F25D 25/00* | (2006.01) |
| *F25D 29/00* | (2006.01) |
| *G06Q 10/087* | (2023.01) |

(52) U.S. Cl.
CPC ........... F25D 29/00 (2013.01); G06Q 10/087 (2013.01); *F25D 2500/06* (2013.01); *F25D 2700/06* (2013.01)

(58) Field of Classification Search
CPC .. F25D 29/00; F25D 2500/06; F25D 2700/06; F25D 23/028; F25D 2700/04; F25D 23/126; G06Q 10/087; F25C 5/22
See application file for complete search history.

(56) References Cited

U.S. PATENT DOCUMENTS

| 7,866,171 B2 | 1/2011 | Cho et al. | |
| 2010/0308073 A1* | 12/2010 | Devilbiss | F25D 23/126 |
| | | | 62/236 |
| 2014/0166153 A1* | 6/2014 | Waugh | F25D 23/126 |
| | | | 141/1 |
| 2015/0285552 A1* | 10/2015 | Swaidan | F25D 23/12 |
| | | | 62/155 |
| 2015/0322694 A1* | 11/2015 | Carr | G07C 9/00944 |
| | | | 70/277 |
| 2019/0272042 A1* | 9/2019 | Shivam | G06F 3/017 |
| 2020/0056832 A1* | 2/2020 | Snyder | H05B 47/11 |
| 2020/0216302 A1* | 7/2020 | Chernov | B67D 1/1236 |

(Continued)

FOREIGN PATENT DOCUMENTS

| CN | 104737842 A * | 7/2015 |
| CN | 212084159 U | 12/2020 |

(Continued)

*Primary Examiner* — Bob Zadeh
(74) *Attorney, Agent, or Firm* — Dority & Manning, P.A.

(57) ABSTRACT

A refrigerator appliance is provided, including a cabinet forming a refrigeration compartment, a freezer compartment, or both. A door is attached to the cabinet, the door configured to selectively allow entry to the refrigeration compartment, the freezer compartment, or both. A dispenser assembly is positioned at the door, the dispenser assembly including a recess extending into the door. The dispenser assembly is configured to egress a fluid, ice, or both, toward the recess. A scanner assembly includes a scanner device. The scanner assembly is positioned behind an external wall of the dispenser assembly.

15 Claims, 9 Drawing Sheets

(56)                    References Cited

U.S. PATENT DOCUMENTS

| | | | |
|---|---|---|---|
| 2021/0112647 A1* | 4/2021 | Coleman | ................. G01S 17/42 |
| 2022/0167777 A1 | 6/2022 | Faro et al. | |
| 2025/0257929 A1* | 8/2025 | Sellers | .................... F25D 23/12 |
| 2025/0257930 A1* | 8/2025 | Sellers | ................. F25D 27/005 |
| 2025/0257936 A1* | 8/2025 | Sellers | ...................... F25C 5/22 |

FOREIGN PATENT DOCUMENTS

| | | |
|---|---|---|
| KR | 20060104364 A | 10/2006 |
| KR | 20100086803 A | 8/2010 |
| KR | 20110000800 U | 1/2011 |
| KR | 101170577 B1 | 8/2012 |

* cited by examiner

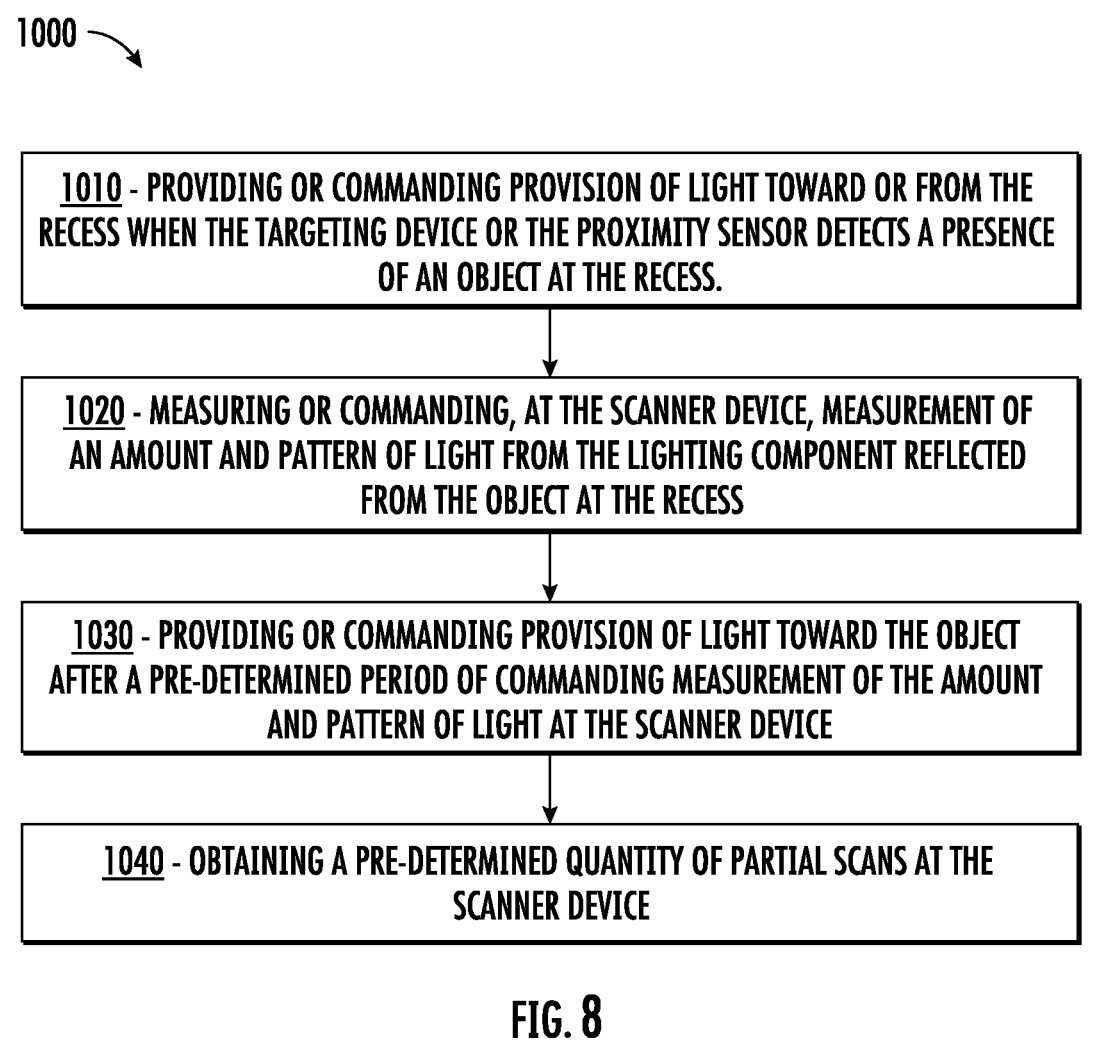

1000

1010 - PROVIDING OR COMMANDING PROVISION OF LIGHT TOWARD OR FROM THE RECESS WHEN THE TARGETING DEVICE OR THE PROXIMITY SENSOR DETECTS A PRESENCE OF AN OBJECT AT THE RECESS.

1020 - MEASURING OR COMMANDING, AT THE SCANNER DEVICE, MEASUREMENT OF AN AMOUNT AND PATTERN OF LIGHT FROM THE LIGHTING COMPONENT REFLECTED FROM THE OBJECT AT THE RECESS

1030 - PROVIDING OR COMMANDING PROVISION OF LIGHT TOWARD THE OBJECT AFTER A PRE-DETERMINED PERIOD OF COMMANDING MEASUREMENT OF THE AMOUNT AND PATTERN OF LIGHT AT THE SCANNER DEVICE

1040 - OBTAINING A PRE-DETERMINED QUANTITY OF PARTIAL SCANS AT THE SCANNER DEVICE

FIG. 8

REFRIGERATOR APPLIANCE AND ASSEMBLY FOR CODE READING

FIELD OF THE INVENTION

The present disclosure is related generally to refrigerator appliances.

BACKGROUND OF THE INVENTION

Refrigerator appliances generally include a refrigeration chamber and a freezer chamber. A dispenser may be included and configured to dispense ice and/or water to a user, such as a user's container. Dispensers may be positioned at a door or a panel at a refrigerator appliance casing. Dispensers may generally be recessed into the door or the panel. However, the recess may prevent access or positioning of containers larger than the recess, which may inhibit positioning of a machine-readable code at a scanner, which may inhibit integration of a scanner to a refrigeration appliance.

Still further, the machine-readable code may be positioned relative to a scanner but obscured, such that the code is at least partially unreadable.

As such, there is a need for improved structures and methods for code reading at refrigerator appliances.

BRIEF DESCRIPTION OF THE INVENTION

Aspects and advantages of the invention will be set forth in part in the following description, or may be apparent from the description, or may be learned through practice of the invention.

An aspect of the present disclosure is directed to a refrigerator appliance. The refrigerator appliance includes a cabinet forming a refrigeration compartment, a freezer compartment, or both. A door is attached to the cabinet, the door configured to selectively allow entry to the refrigeration compartment, the freezer compartment, or both. A dispenser assembly is positioned at the door and includes a recess extending into the door. The dispenser assembly is configured to egress a fluid, ice, or both, toward the recess. A scanner assembly includes a scanner device. The scanner assembly is positioned behind an external wall of the dispenser assembly.

Another aspect of the present disclosure is directed to a dispenser assembly for a refrigerator appliance. The dispenser assembly includes a first lighting component positioned behind an external wall. The first lighting component is configured to illuminate a recess formed at the dispenser assembly. A scanner assembly includes a second lighting component and a scanner device. The scanner assembly is positioned behind the external wall of the dispenser assembly. The scanner device is directed toward the recess at an angle between approximately 15 degrees and approximately 90 degrees.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 8 provides a flowchart outlining steps of a method for code reading at an appliance in accordance with aspects of the present disclosure.

Figure 1:
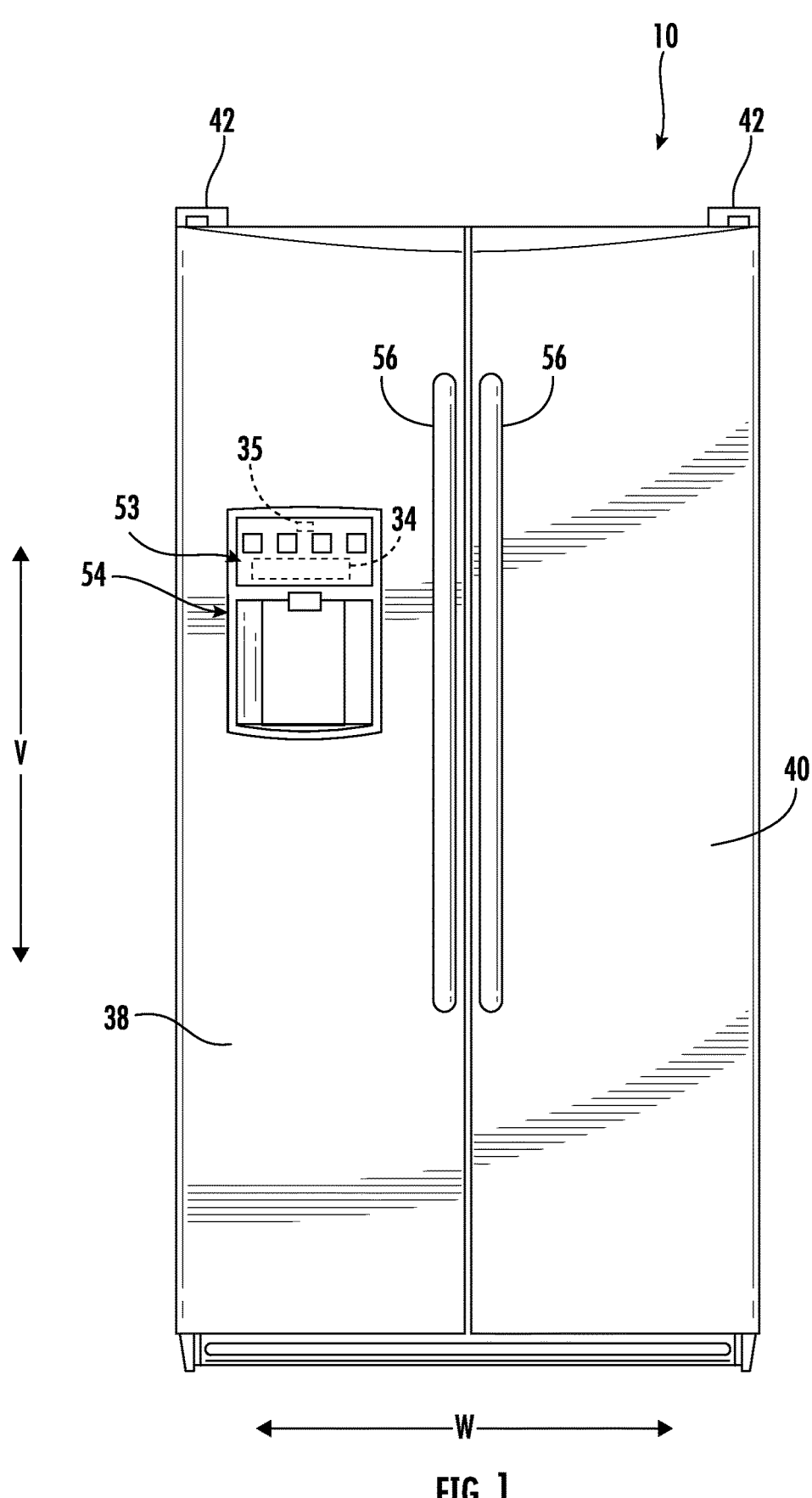
FIG. 1 is a perspective view of a refrigerator appliance according to an exemplary embodiment of the present subject matter with doors of the example refrigerator appliance shown closed.

Repeat use of reference characters in the present specification and drawings is intended to represent the same or analogous features or elements of the present invention.

DETAILED DESCRIPTION

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled,"

"fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

Figure 2:
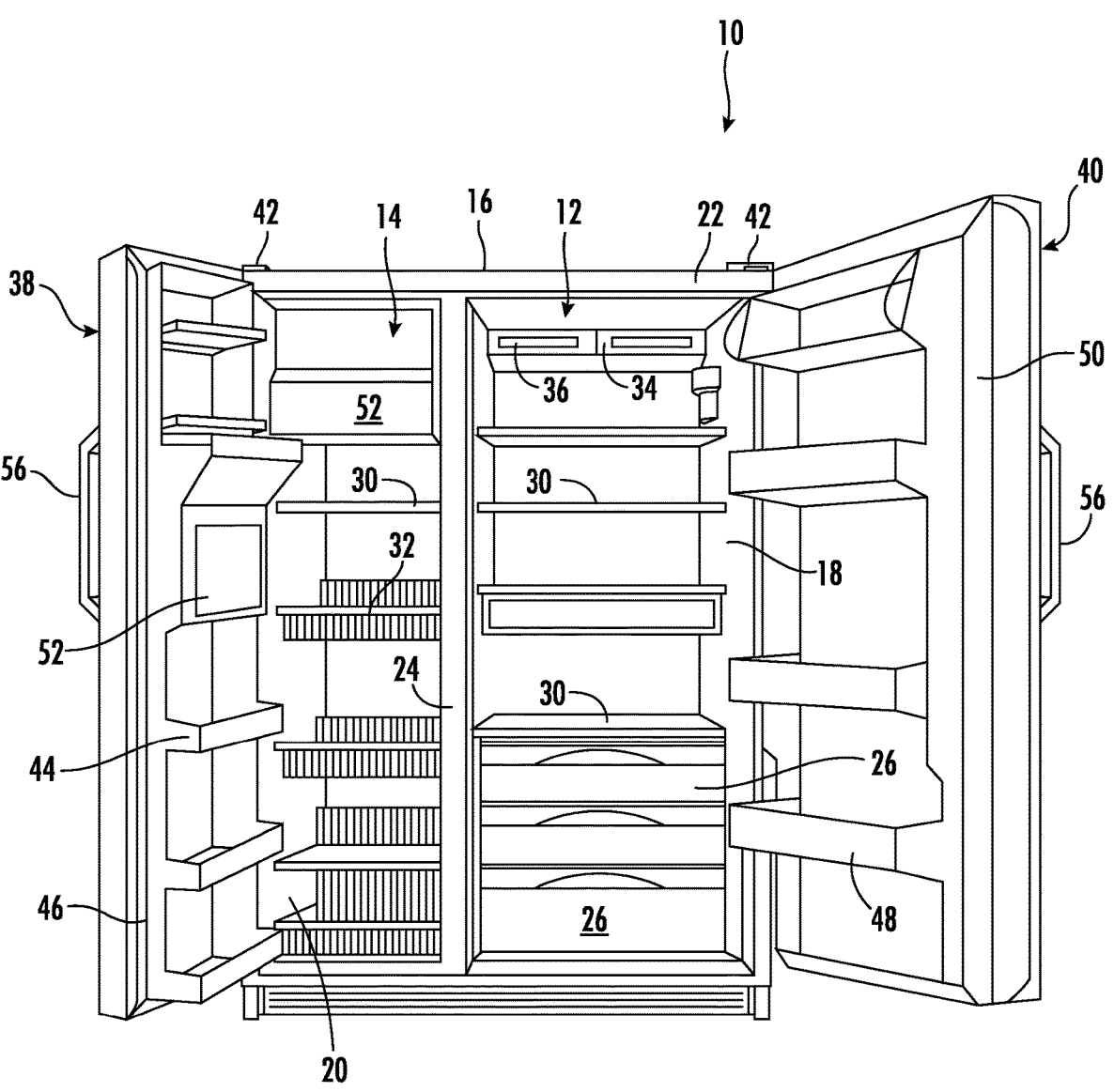
FIG. 2 is a perspective view of the exemplary refrigerator appliance with doors shown open.
Figure 6:
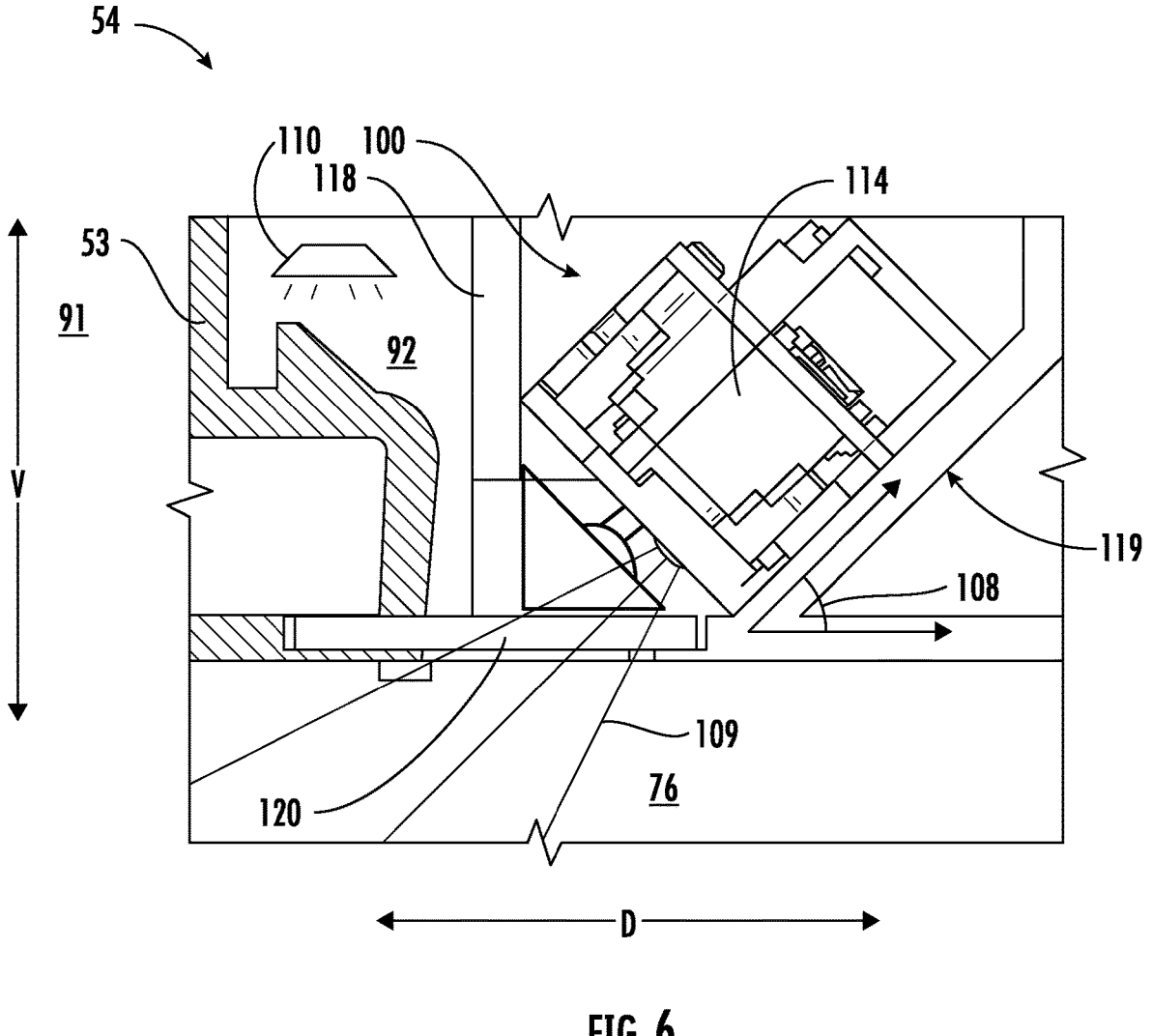
FIG. 6 is a cross-sectional view of an embodiment of the dispenser assembly in accordance with aspects of the present disclosure.

FIG. 1 provides a perspective view of a refrigerator appliance 10 according to an exemplary embodiment of the present subject matter. FIG. 2 provides a perspective view of the refrigerator appliance 10 with doors 38, 40 open to view refrigeration and freezer compartments 12, 14 formed within a cabinet or outer case 16. FIG. 1 provides a reference vertical direction V and width direction W. FIG. 6 further depicts a reference depth direction D orthogonal to the vertical direction V and width direction W, such as corresponding to a dimension extending from doors 38, 40 toward a back wall of the outer case 16.

Referring to FIG. 2, refrigerator appliance 10 includes the refrigeration compartment 12 and the freezer compartment 14, with the compartments arranged side-by-side and contained within the outer case 16. Outer case 16 and inner liners 18 and 20 are generally molded from a suitable plastic or foam material. For instance, the outer case may form a molded plastic or foam outer case. Thus, refrigerator appliance 10 is generally referred to as a side-by-side style refrigerator appliance. In alternative exemplary embodiments, refrigerator appliance 10 may include a single liner and a mullion that spans between opposite sides of the single liner to divide it into the freezer compartment 14, such as a compartment configured for frozen foods, and the refrigeration compartment 12, such as a compartment configured for fresh foods. Outer case 16 is normally formed by folding a sheet of a suitable material, such as pre-painted steel, into an inverted U-shape to form top and side walls of outer case 16. A bottom wall of outer case 16 normally is formed separately and attached to the case side walls and to a bottom frame that provides support for refrigerator appliance 10. However, it should be appreciated that outer case 16 may be formed by other suitable manufacturing methods.

A breaker strip 22 extends between a case front flange and outer front edges of inner liners 18 and 20. Breaker strip 22 is formed from a suitable resilient material, such as an extruded acrylo-butadiene-styrene based material (commonly referred to as ABS). The insulation in the space between inner liners 18 and 20 is covered by another strip of suitable resilient material, which also commonly is referred to as a mullion 24 and may be formed of an extruded ABS material. Breaker strip 22 and mullion 24 may form a front face, and extend completely around inner peripheral edges of outer case 16 and vertically between inner liners 18 and 20.

Slide-out drawers 26 and shelves 30 are normally provided in refrigeration compartment 12 to support items being stored therein. In addition, a shelf 30, a basket 32, or both, are generally provided in freezer compartment 14.

Refrigerator appliance features are regulated with a controller 34 according to user preference via manipulation of a control interface 36 mounted in an upper region of refrigeration compartment 12 and coupled to controller 34. Input/output ("I/O") signals may be routed between controller 34 and various operational components of refrigerator appliance 10. The components of refrigerator appliance 10 may be in communication with controller 34 via one or more signal lines or shared communication busses.

Controller 34 can be any device that includes one or more processors and a memory. As an example, in some embodiments, controller 34 may be a single board computer (SBC). For example, controller 34 can be a single System-On-Chip (SOC). However, any form of controller 34 may also be used to perform the present subject matter. The processor(s) can be any suitable processing device, such as a microprocessor, microcontroller, integrated circuit, or other suitable processing devices or combinations thereof. The memory can include any suitable storage media, including, but not limited to, non-transitory computer-readable media, RAM, ROM, hard drives, flash drives, accessible databases, or other memory devices. The memory can store information accessible by processor(s), including instructions that can be executed by processor(s) to perform aspects of the present disclosure.

Referring to FIG. 1, in some embodiments, the appliance 10 may include a sound emitting device 35 or other auditory device configured to emit an audio signal receptive by a user. The sound emitting device 35 is operably coupled to controller 34, such as to receive a control signal to command an audible output, e.g., a voice, ring, tune, music, or other auditory output generally understood for a sound emitting device. In some embodiments, such as further described herein, the sound emitting device 35 is operably coupled to a scanner assembly 100 (FIG. 3), such as to receive a control signal from the scanner assembly 100 to command an audible output, such as further described herein.

It should be appreciated that embodiments of the appliance 10 including the controller 34, the scanner assembly 100, or the sound emitting device 35 may include operable and communicative coupling via a wired or wireless bus as may generally be understood in the art. Schematic depictions of the controller 34, the scanner assembly 100, or the sound emitting device 35 should be understood to include busses, conduits, transmitters, wires, antennas, or other devices and structures generally understood for electrical or electronic between such devices.

Referring to FIGS. 1-2, a freezer door 38 and a fresh food door 40 close access openings to freezer compartment 14 and refrigeration compartment 12. Freezer door and fresh food door 38 and 40 are each mounted by a top hinge 42 and a bottom hinge (not shown) to rotate about its outer vertical edge between an open position, as shown in FIG. 1, and a closed position. Freezer door 38 may include a plurality of storage shelves 44 and a sealing gasket 46, and fresh food door 40 also includes a plurality of storage shelves 48 and a sealing gasket 50.

Freezer compartment 14 may include an automatic ice maker 52 and a dispenser assembly 54 provided in freezer door 38 such that ice and/or chilled water can be dispensed without opening freezer door 38, as is well known in the art. Freezer door and fresh food door 38 and 40 may be opened by handles 56. It should be appreciated that the dispenser assembly 54 may be positioned at an exterior portion of the door, such as depicted in FIG. 1, or positioned in an interior portion, such as to require opening the door to access the dispenser assembly 54.

Refrigerator appliance 10 also includes a machinery compartment (not shown) that at least partially contains a cooling system including components for executing a known vapor compression cycle for cooling air. The cooling system may include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more refrigerator or freezer compartments via fans. Also, a cooling loop can be added to direct cool the ice maker to form ice cubes, and a heating loop can be added to help remove ice from the ice maker. Collectively, the vapor compression cycle components in a refrigeration circuit, associated fans, and associated compartments are conventionally referred to as a sealed system. The construction and operation of the sealed system are well known to those skilled in the art.

Figure 3:
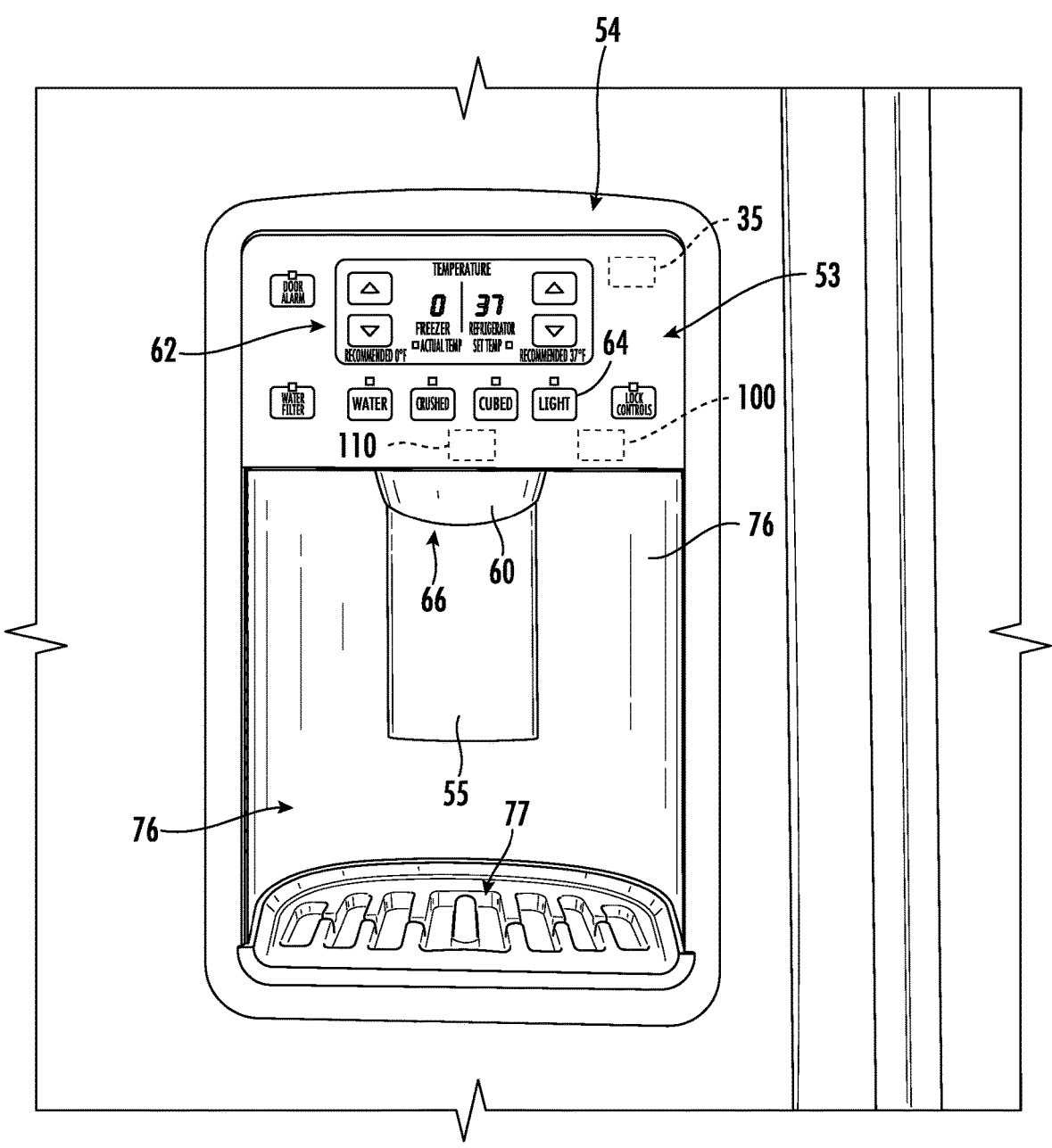
FIG. 3 is a front view of an exemplary dispenser assembly of the refrigerator appliance in accordance with aspects of the present disclosure.
Figure 4:
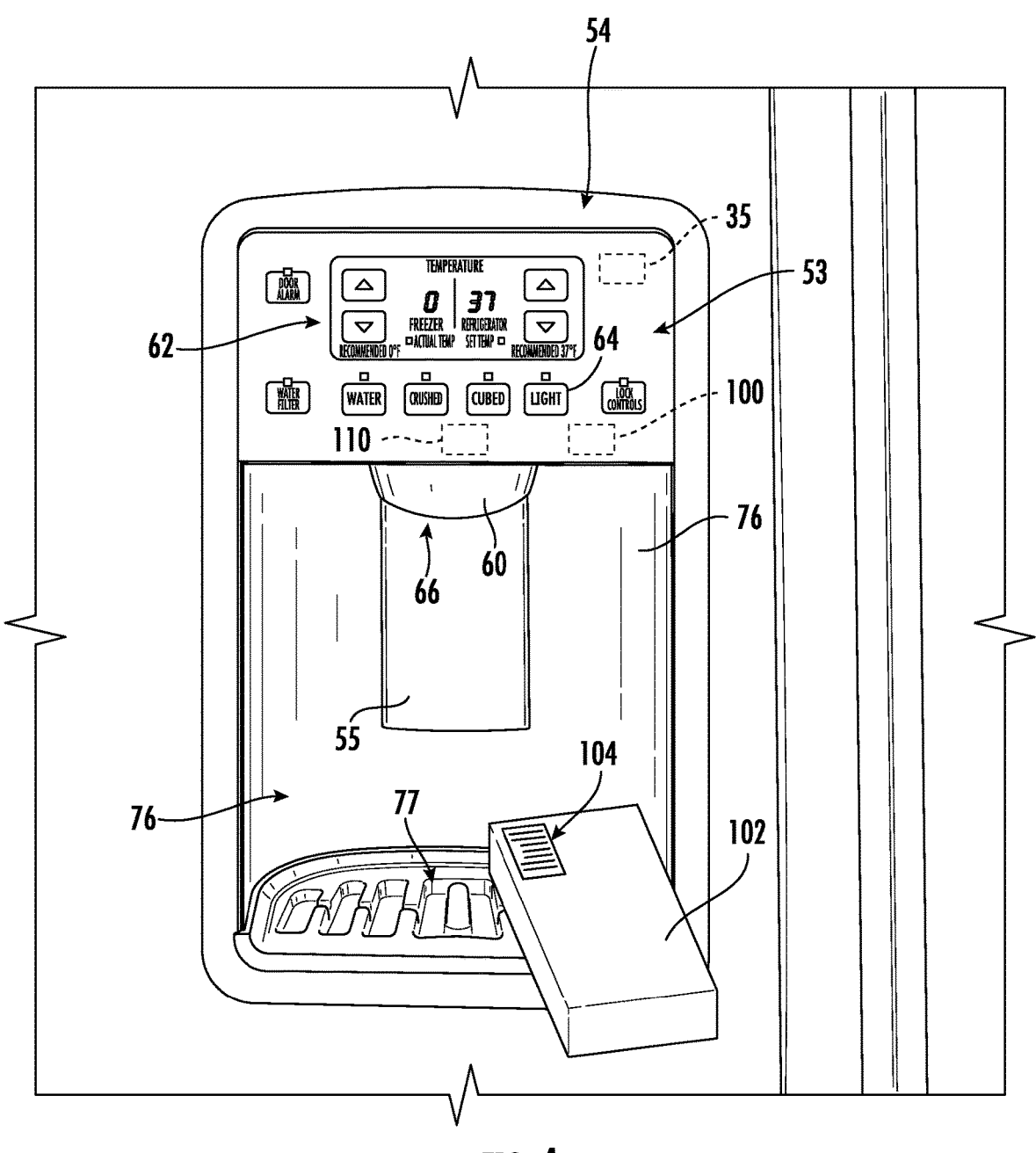
FIG. 4 is a front view of an exemplary dispenser assembly of the refrigerator appliance in accordance with aspects of the present disclosure.

Referring to FIG. 3, a detailed view of an exemplary embodiment of the dispenser assembly 54 is provided. The dispenser assembly 54 may include a control panel 62 providing a display screen and a control interface 64, such as buttons, knobs, levers, or other interfaces at which a user may select one or more functions of the dispenser assembly 54. Functions may include, but not limited to, dispensing ice, selecting a type of ice to be dispensed (e.g., crushed or cubed), dispensing fluid (e.g., water), operating a light (e.g., first lighting component 110, second lighting component 112), etc. Control interface 64 may provide messages, such as, but not limited to, temperature, filter status, lock controls, etc.

The dispenser assembly 54 may include a dispenser control interface 55, such as a dispenser panel, configured to release ice or fluid when articulated. For instance, a user may position a container onto the dispenser control interface 55 to command release of ice or fluid from the dispenser assembly 54.

The dispenser assembly 54 includes a mouth 60 forming, at least in part, an outlet opening 66. The mouth 60 may generally form a wall forming a passage through which ice passes toward the user's container. The mouth 60 may generally be positioned within a recess 76. A drain 77 is positioned within the recess 76 and below the mouth 60, such as to receive fluid or ice that may fall thereinto. A fluid nozzle 72 extends toward the drain 77 and is configured to dispense a fluid (e.g., water) to a container.

Referring now to FIGS. 4-7, embodiments of the appliance 10 include the dispenser assembly 54 having a scanner assembly 100. In various embodiments, the scanner assembly 100 is configured to direct a beam of light across a machine-readable code 104, such as a barcode, a quick-response (QR) code, or other optical readable code format positioned at an object 102, such as, but not limited to, a grocery item, foodstuff, container, or other object at which a machine-readable code may be positioned. The scanner assembly 100 includes an imaging or scanner device 114 configured to obtain or measure fidelity of scan data from light reflected from the object 102. For instance, the scanner assembly 100 may be configured to detect or measure an amount and pattern of light reflected from the object 102. For instance, the scanner device 114 may include a laser configured to direct a beam of light across the machine-readable code 104 and measure fidelity of scan data from the code 104, such as an amount and patter of light that is reflected from the code 104. The scanner assembly 100 converts the obtained light energy into electrical energy, such as an electrical signal. The electrical energy or signal is converted into data by a decoder. For instance, in some embodiments, the scanner assembly 100 includes electronics, circuitry, and/or processors configured to convert the electrical signal into data. In still some embodiments, the scanner assembly 100 is communicatively coupled to the controller 54 and configured to transmit the electrical signal to the controller 54 to convert the signal into data. In various embodiments, the scanner assembly 100 or the controller 54 may include the decoder.

In some embodiments, the scanner assembly 100, or portions thereof, is positioned behind an external wall 53 of the dispenser assembly 54. For instance, referring to FIG. 6, the external wall 53 may form an outer wall of the appliance 10, such as may be flush with, or extend from, an outer face of one or more doors 38, 40 (FIG. 1). The external wall 53 may form an interior volume 92 at the dispenser assembly 54 at which the scanner assembly 100 is positioned. The external wall 53 may further separate the interior volume 92 from an exterior volume 91 outside of the appliance 10. In some embodiments, the recess 76, at which a container may be positioned to receive water, ice, or other fluids from the dispenser assembly 54, is positioned below the dispenser assembly 54. Various embodiments of the scanner assembly 100 position the scanner device 114 inward along the depth direction D from the external wall 53, such as to position the scanner device 114 above the recess 76 along the vertical direction V. In still various embodiments, the scanner assembly 100, or portions thereof, such as the scanner device 114, is positioned adjacent along the width direction W, the depth direction D, or both, of the fluid nozzle 72, the sensor 122, or both.

Referring still to FIG. 6, in various embodiments, the scanner assembly 100 is housed in a casing 118. The casing 118 may generally position the scanner device 114 angled toward the recess 76 and behind the external wall 53. The casing 118 may position a separator wall 120 between the recess 76 and the scanner assembly 100. In some embodiments, the separator wall 120 forms a clear or transparent surface through which light is transmittable to and from the scanner assembly 100. In still some embodiments, the separator wall 120 includes a prism or mirror configured to direct light to or from the scanner assembly 100, such as the second lighting component 112, the scanner device 114, or the targeting device 116.

Figures 5A, 5B:
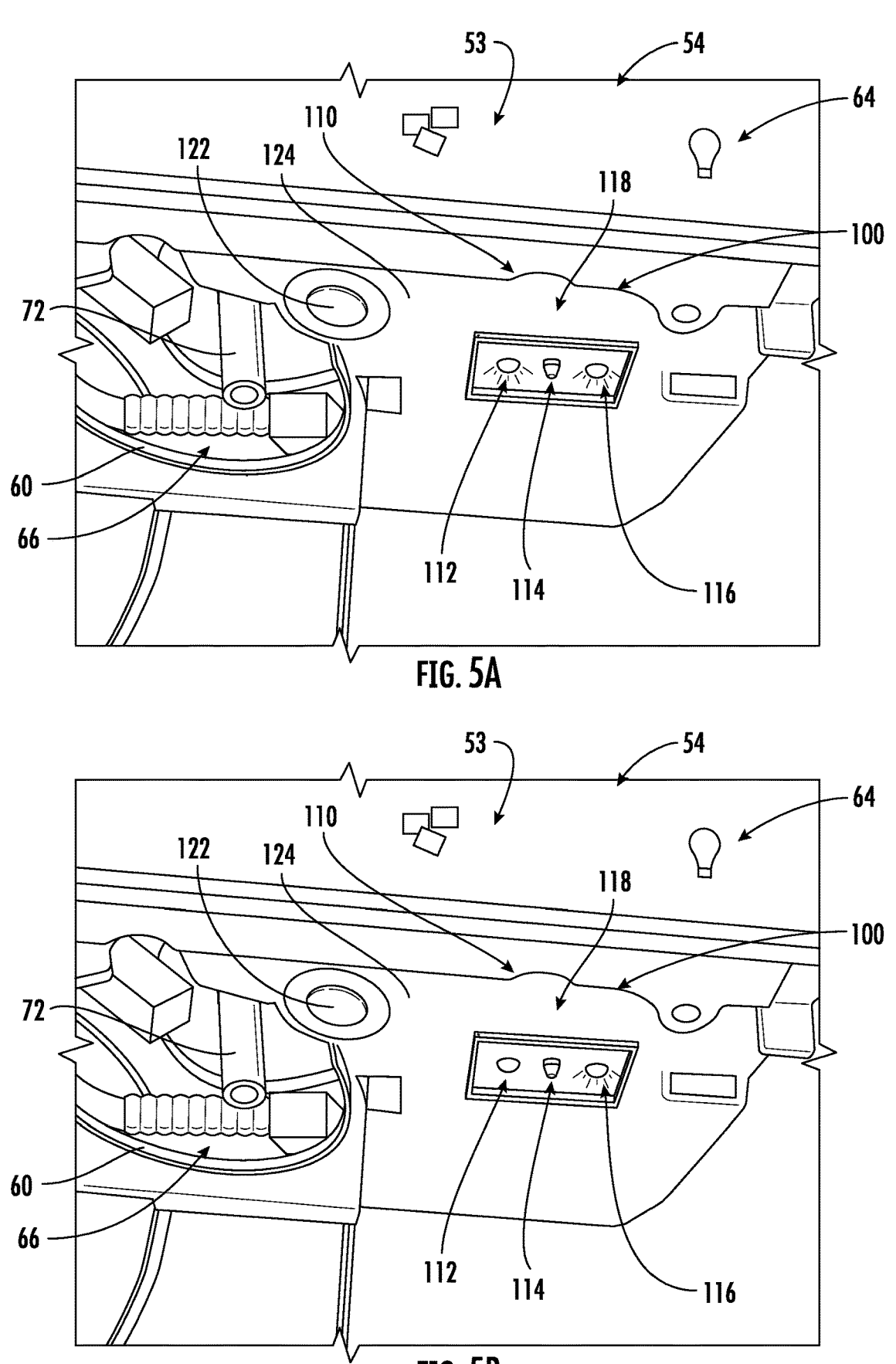
FIG. 5A is a perspective view of an embodiment of the dispenser assembly with a lighting component in a low- or no-light emitting state in accordance with aspects of the present disclosure.
FIG. 5B is a perspective view of an embodiment of the dispenser assembly with a lighting component in a light-providing state in accordance with aspects of the present disclosure.

Referring to FIGS. 5A-5B and FIG. 6, the appliance 10 includes a first lighting component 110. The first lighting component 110 is configured to provide lighting to or from the recess 76. The first lighting component 110 may be positioned at the interior volume 92 or at the recess 76. The scanner assembly 100 includes a second lighting component 112 positioned substantially co-directional to an orientation of the scanner device 114 or targeting device 116, such as a laser or other light-based aiming guide. The second lighting component 112 may generally be positioned at the casing 118, such as alongside the targeting device 116, the scanner device 114, or both. The second lighting component 112, the targeting device 116, or both, may be included with the scanner device 114 or as a separate component.

Referring to FIG. 6, in various embodiments, the scanner assembly 100 is configured to transmit or receive light at an angle 108 extending relative to the depth direction D. The angle 108 may extend between approximately 15 degrees and approximately 90 degrees from the depth direction D. In some embodiments, the casing 118 includes walls 119 positioning the scanner assembly 100 at the angle 108 from the depth direction D. In still some embodiments, the separator wall 120 is a prism or mirror configured to output light corresponding to the angle 108, such as depicted schematically via light rays 109.

Figure 7:
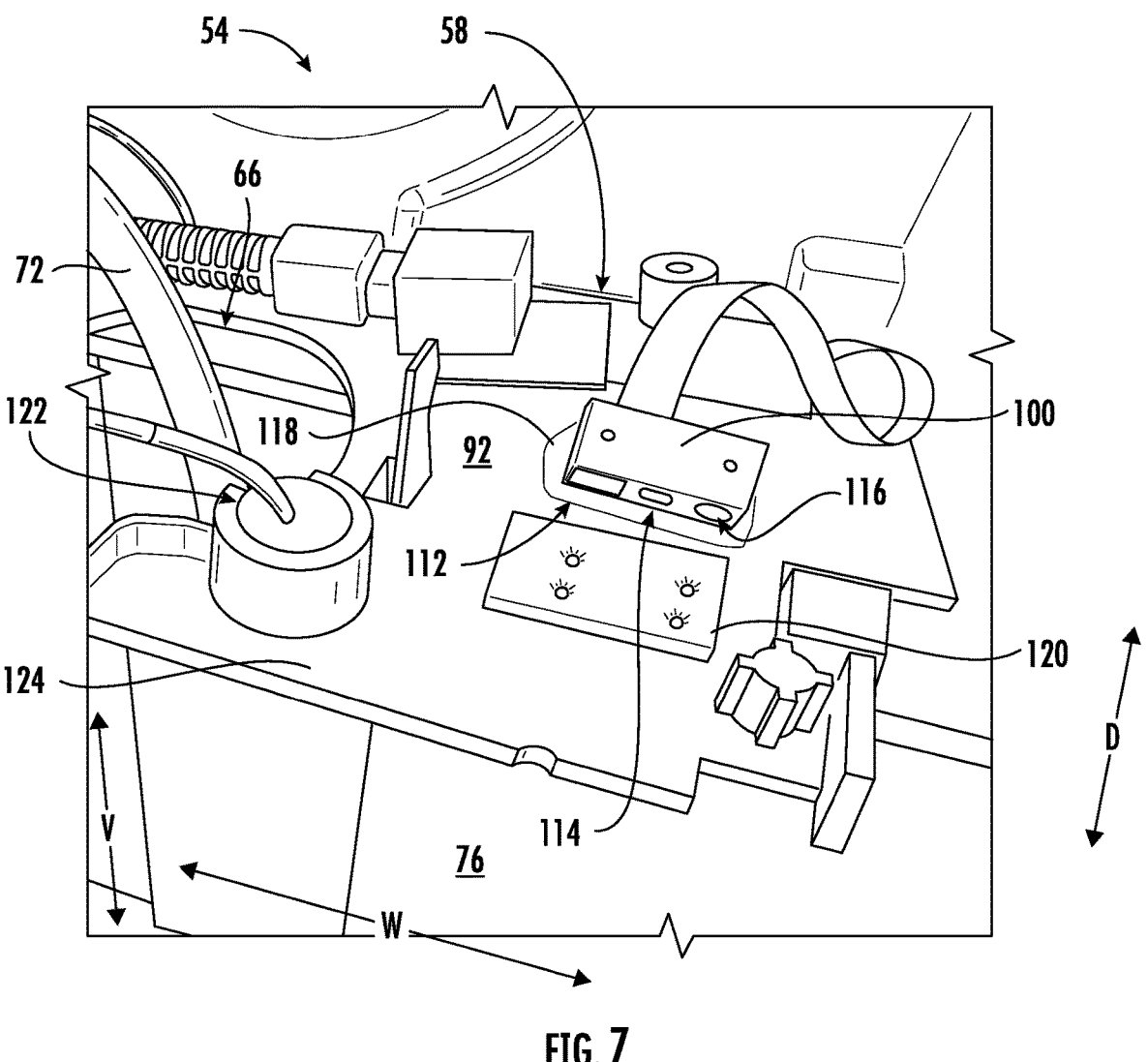
FIG. 7 is a perspective view of an embodiment of the scanner assembly at the dispenser assembly in accordance with aspects of the present disclosure.

Referring now to FIGS. 5A-5B and FIG. 7, in some embodiments, the appliance 10 may include a sensor 122 at the dispenser assembly 54. The sensor 122 can include a proximity sensor or transducer, such as, but not limited to, an ultrasonic sensor, a light-emitting sensor, a magnetic sensor, or other appropriate sensor at a dispensing assembly for an appliance.

In various embodiments, the sensor 122 is positioned adjacent along the width direction W, the depth direction D, or both, to the scanner assembly 100. The sensor 122 may be supported or affixed at a housing 124. In some embodiments, the housing 124 may support or affix the casing 118 and the separator wall 120 at the dispenser assembly 54. Embodiments of the dispenser assembly 54 including the scanner assembly 100 positioned at the interior volume 92 may facilitate scanning a machine-readable code. Embodiments depicted and described herein may further improve a field of view of the sensor 122, such as removing the scanner assembly 100 from the field of view of the sensor 122.

In various embodiments, a user may manually articulate the second lighting component 112 (e.g., via controller interface 64) to provide or discontinue lighting. In some embodiments of a method for operation, the controller 54 or scanner assembly 100 is configured to provide light from the second lighting component 112 after a pre-determined period or frequency of obtaining partial scans from the scanner device 114, such as may be indicative of poor fidelity of scan data, such as a failure of the scanner device 114 to obtain an amount and pattern of light reflected from the object 102.

In an exemplary embodiment of a method for operation, the controller 54 or scanner assembly 100 may be configured to maintain the second lighting component 112 in a low- or no-light emitting state (e.g., depicted in FIG. 5A) until a user signal or control signal articulates the second lighting component 112 to a light-providing state (e.g., depicted in FIG. 5B). For instance, the first lighting component 110 may form a primary recess lighting at the appliance 10. Light from the first lighting component 110 may be sufficient for the scanner device 114 to scan the machine-readable code 104. When the light from the first lighting component 110 is insufficient for the scanner device 114 to scan the machine-readable code 104, the second lighting device 112 is articulated to the light-providing state (e.g., depicted in FIG. 5B) to provide additional lumens toward the object 102, such as to facilitate scanning the machine-readable code 104.

Referring back to FIG. 3, in various embodiments, the sound emitting device 35 is positioned outside of the casing 118 at which the scanner assembly 100 is housed. The sound emitting device 35 may form a structure or device separate from the scanner assembly 100, such as outside or separate from the casing 118, the housing 124, or both. The sound emitting device 35 may be integrated to the controller 34 or positioned outside of the dispenser assembly 54 generally. Accordingly, embodiments of the scanner assembly 100 may be communicatively coupled with the controller 34 and sound emitting device 35, such as to transmit signals based on partial or completely obtained scans, or operation or discontinuation of provision of light (e.g., from one or more lighting components 110, 112).

Figure 9:
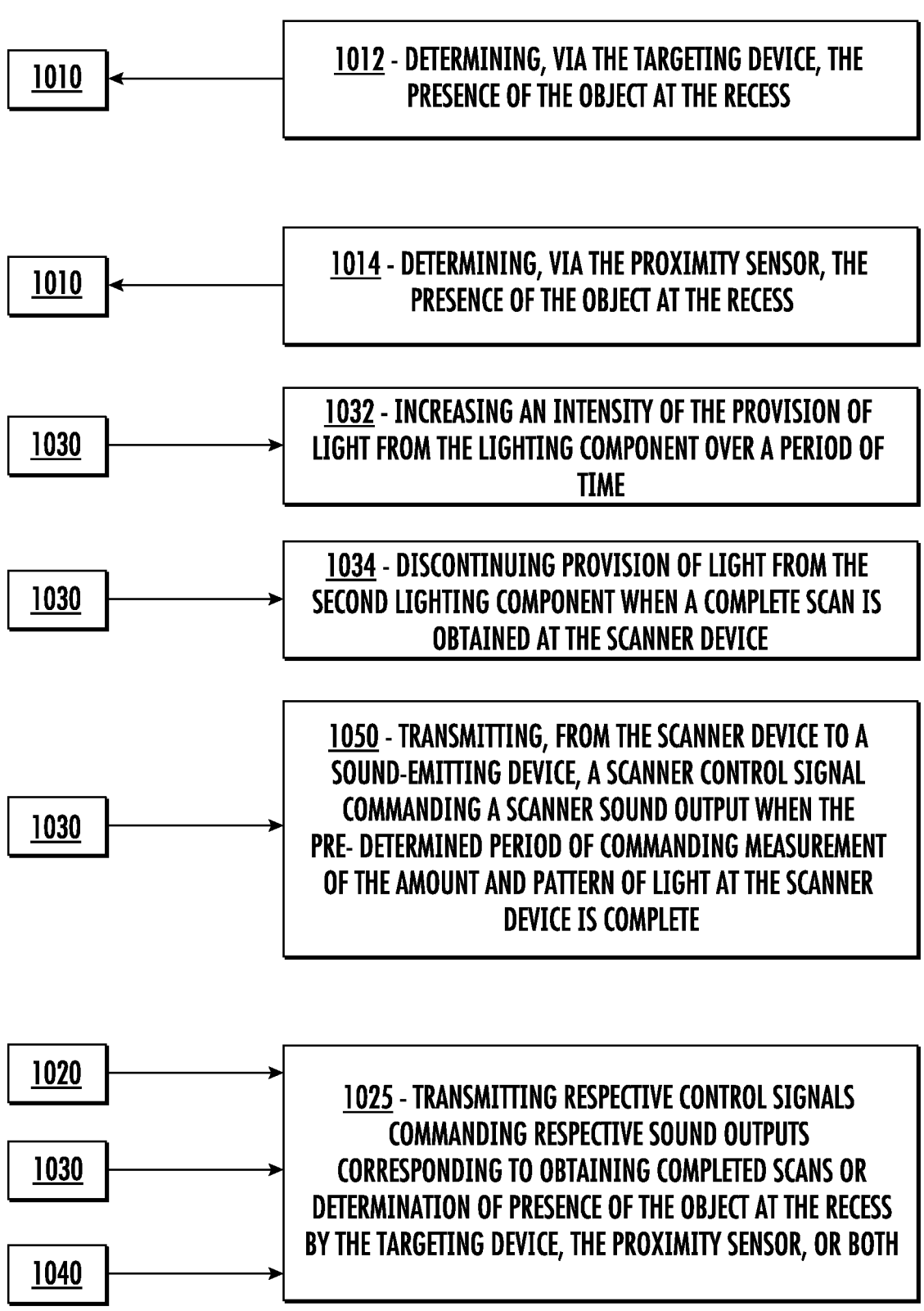
FIG. 9 provides a flowchart outlining steps of a method for code reading at an appliance in accordance with aspects of the present disclosure.

Referring now to FIGS. 8-9, flowcharts outlining a method for a reading a machine-readable code at an appliance are provided (hereinafter, "method 1000"). Embodiments of the method 1000 may be performed at embodiments of the appliance 10 such as provided herein. One or more steps of the method 1000 may be stored at the controller 34 and executed, at least in part, by the controller 34, the scanner device 114, the lighting components 110, 112, the targeting device 116, the sensor 122, the sound emitting device 35, or combinations thereof. For instance, embodiments of the method 1000 may include communicatively coupling (e.g., via a wired or wireless communication connection) a controller (e.g., controller 34) to a scanner assembly (e.g., scanner assembly 100), a lighting component at the dispenser assembly (e.g., first lighting component 110), a lighting component at the scanner assembly (e.g., second lighting component 112), or a proximity sensor (e.g., sensor 122). The controller is configured to store or execute instructions that causes the refrigerator appliance, or portions thereof (e.g., the scanner assembly 100, the lighting component 110, the sound emitting device 35, the sensor 122, etc.) to perform operations, such as one or more steps of the method 1000.

In some embodiments, method 1000 includes at 1010 providing or commanding, at the lighting component (e.g., first lighting component 110), provision of light toward or from the recess (e.g., recess 76) when the targeting device (e.g., targeting device 116) or the proximity sensor (e.g., sensor 122) detects a presence of an object (e.g., object 102) at the recess.

Method 1000 includes at 1020 measuring or commanding, at the scanner device (e.g., scanner device 114), measurement of fidelity of scan data from light reflected from the object at the recess from the first lighting component. For instance, method 1000 at 1020 may include measuring an amount and pattern of light from the first lighting component reflected from the object at the recess, such as at the machine-readable code (e.g., code 104).

Method 1000 includes at 1030 providing or commanding, at the second lighting component (e.g., second lighting component 112), provision of light toward the recess after a pre-determined period of commanding measurement of the amount and pattern of light at the scanner device. In some embodiments, method 1000 includes at 1032 increasing an intensity of the provision of light from the second lighting component over a period of time. In still some embodiments, the method 1000 includes at 1034 discontinuing provision of light from the second lighting component when a complete scan is obtained at the scanner device. In various embodiments, the period of time over which the intensity of the provision of light is provided may correspond to a period between commencing provision (or a command therefor) of the light from the second lighting component to when light is discontinued (or a command therefor) from the second lighting component.

In some embodiments, method 1000 includes at 1012 determining, via the targeting device, the presence of the object at the recess. In still some embodiments, method 1000 includes at 1014 determining, via the proximity sensor, the presence of the object at the recess.

In still some embodiments, method 1000 includes at 1040 obtaining a pre-determined quantity of partial scans at the scanner device, The pre-determined quantities may correspond to incomplete or partial scans by the scanner device to the machine-readable code. Method 1000 may provide light from the second lighting component (e.g., from the scanner assembly) after the pre-determined period of time or obtaining the pre-determined quantity of partial scans. The additional lumens from the second lighting component generally, or particularly directed along the angle 108 such as described herein, may facilitate obtaining the full or complete scan of the machine-readable code at the object by the scanner assembly.

Referring to FIG. 9, in some embodiments, method 1000 includes at 1050 transmitting, from the scanner device to a sound emitting device (e.g., sound emitting device 35) positioned outside of the scanner assembly, a scanner control signal commanding a scanner sound output when the pre-determined period of commanding measurement of the amount and pattern of light at the scanner device is complete.

Method 1000 may include at 1025 transmitting respective control signals commanding respective sound outputs corresponding to obtaining completed scans or determination of presence of the object at the recess by the targeting device, the proximity sensor, or both.

Embodiments of the scanner assembly 100 may allow for the first lighting component 110 to be positioned with regard to aesthetics while allowing the second lighting component 112 to augment or facilitate operation of the scanner device 114. Embodiments of the appliance 10 may position the scanner assembly 100 to be obscured from view by a user (e.g., obscured from view from the exterior volume 91) while allowing for scanning of objects at the recess 76. Such obstruction may mitigate risks of the targeting device or lighting component shining toward a person or animal whose eye is positioned along the vertical direction V at or below the scanner assembly.

Embodiments of the appliance 10 may facilitate interchangeability of scanner assemblies 100, or components thereof (e.g., second lighting component 112, scanner device 114, targeting device 116, or combinations thereof). For instance, the casing 118 may provide a housing configured to direct the scanner assembly 100 toward the machine-readable code 104 without requiring snapping, fitting, or direct mounting of an imaging or scanner device to the dispenser assembly 54 or surrounding walls at the appliance 10.

Embodiments of the appliance 10 may mitigate fluid contact (e.g., from the fluid nozzle or a container at the recess) at the scanner assembly 100. For instance, the separator wall 120 may provide a splash shield protecting the scanner assembly 100 from undesired fluid contact. The separator wall 120 may additionally focus, diffuse, or orient light to or from the scanner assembly 100 and the machine-readable code 104, such as along angle 108 described herein.

Embodiments of the appliance 10 and method 1000 may facilitate interchangeability of scanner assemblies, or components thereof, and sound emitting devices 35. For instance, the sound emitting device 35 may form a separate component from the scanner assembly 100, such as to allow for an integrated sound emitting device at the appliance 10 to be utilized for control signals, commands, and sound outputs based on operations of the scanner assembly 100.

Further aspects of the disclosure are provided in one or more of the following clauses:

1. A refrigerator appliance, including a cabinet forming a refrigeration compartment, a freezer compartment, or both; a door attached to the cabinet, the door configured to selectively allow entry to the refrigeration compartment, the freezer compartment, or both; a dispenser assembly positioned at the door, the dispenser assembly including a recess extending into the door, the dispenser assembly configured to egress a fluid, ice, or both, toward the recess; and a scanner assembly including a scanner device, the scanner assembly positioned behind an external wall of the dispenser assembly.

2. The refrigerator appliance of any one or more clauses herein, including a casing at which the scanner assembly is positioned, wherein the casing disposes the scanner device at an angle toward the recess and behind the external wall.

3. The refrigerator appliance of any one or more clauses herein, wherein the angle is between approximately 15 degrees and approximately 90 degrees.

4. The refrigerator appliance of any one or more clauses herein, the scanner assembly including a targeting device, wherein the casing disposes the targeting device at the angle toward the recess and behind the external wall.

5. The refrigerator appliance of any one or more clauses herein, wherein the scanner assembly includes a lighting component.

6. The refrigerator appliance of any one or more clauses herein, including a housing at which a sensor is positioned, wherein the sensor is directed toward the recess.

7. The refrigerator appliance of any one or more clauses herein, wherein the housing includes a casing at which the scanner assembly is positioned, and wherein the housing positions the scanner assembly adjacent along a width direction, a depth direction, or both, to the sensor.

8. The refrigerator appliance of any one or more clauses herein, wherein the dispenser assembly includes an outlet opening configured to egress the fluid, the ice, or both, toward the recess, and wherein the housing positions the scanner assembly above the outlet opening.

9. The refrigerator appliance of any one or more clauses herein, wherein the sensor is a proximity sensor.

10. The refrigerator appliance of any one or more clauses herein, including a housing at which a separator wall is positioned, wherein the separator wall is disposed between the scanner device and the recess.

11. The refrigerator appliance of any one or more clauses herein, wherein the separator wall forms a prism or mirror.

12. A dispenser assembly for a refrigerator appliance, including a first lighting component positioned behind an external wall, the first lighting component configured to illuminate a recess formed at the dispenser assembly; and a scanner assembly including a second lighting component and a scanner device, the scanner assembly positioned behind the external wall of the dispenser assembly, wherein the scanner device is directed toward the recess at an angle between approximately 15 degrees and approximately 90 degrees.

13. The dispenser assembly of any one or more clauses herein, including a casing at which the scanner assembly is positioned, wherein the casing disposes the scanner device at the angle toward the recess and behind the external wall.

14. The dispenser assembly of any one or more clauses herein, the scanner assembly including a targeting device, wherein the casing disposes the targeting device at the angle toward the recess and behind the external wall.

15. The dispenser assembly of any one or more clauses herein, wherein the scanner assembly includes a second lighting component.

16. The dispenser assembly of any one or more clauses herein, including a housing at which a proximity sensor is positioned.

17. The dispenser assembly of any one or more clauses herein, wherein the housing includes a casing at which the scanner assembly is positioned, and wherein the housing positions the scanner assembly adjacent along a width direction, a depth direction, or both, to the sensor.

18. The dispenser assembly of any one or more clauses herein, wherein the dispenser assembly includes an outlet opening through which a fluid nozzle extends toward the recess, and wherein the housing positions the scanner assembly above the outlet opening.

19. The dispenser assembly of any one or more clauses herein, including a housing at which a separator wall is positioned, wherein the separator wall is disposed between the scanner device and the recess.

20. The dispenser assembly of any one or more clauses herein, wherein the separator wall forms a prism or mirror 21. A refrigerator appliance, including a cabinet forming a refrigeration compartment, a freezer compartment, or both; a door attached to the cabinet, the door configured to selectively allow entry to the refrigeration compartment, the freezer compartment, or both; a dispenser assembly positioned at the door, the dispenser assembly including a recess extending into the door, the dispenser assembly configured to egress a fluid, ice, or both, toward the recess; a scanner assembly including a scanner device and a targeting device, wherein the scanner device and the targeting device are positioned at an angle toward the recess and behind the external wall; and a controller, the controller communicatively coupled to the scanner device and the targeting device, the controller configured to execute instructions that causes the refrigerator appliance to perform operations, the operations including commanding, at the scanner assembly, measuring fidelity of scan data reflected from the object at the recess; and commanding, at a lighting component or the targeting device at the scanner assembly, provision of light toward or from the recess after a pre-determined period of commanding measurement of the amount and pattern of light at the scanner device.

22. The refrigerator appliance of any one or more clauses herein, the operations including determining, via the targeting device, the presence of the object at the recess.

23. The refrigerator appliance of any one or more clauses herein, wherein the pre-determined period of commanding measurement of the amount and pattern of light at the scanner device includes obtaining a pre-determined quantity of partial scans at the scanner device.

24. The refrigerator appliance of any one or more clauses herein, the operations including increasing an intensity of the provision of light from the lighting component over a period of time.

25. The refrigerator appliance of any one or more clauses herein, the operations including discontinuing provision of light from the lighting component when a complete scan is obtained at the scanner device.

26. The refrigerator appliance of any one or more clauses herein, including a casing at which the scanner assembly is positioned, wherein the casing disposes the scanner device and the targeting device at the angle toward the recess and behind the external wall.

27. The refrigerator appliance of any one or more clauses herein, wherein the angle is between approximately 15 degrees and approximately 90 degrees.

28. The refrigerator appliance of any one or more clauses herein, including a housing at which a proximity sensor is positioned.

29. The refrigerator appliance of any one or more clauses herein, the operations including determining, via the proximity sensor, the presence of the object at the recess.

30. The refrigerator appliance of any one or more clauses herein, wherein the housing includes a casing at which the scanner assembly is positioned, and wherein the housing positions the scanner assembly adjacent along a width direction, a depth direction, or both, to the proximity sensor.

31. A refrigerator appliance, including a cabinet forming a refrigeration compartment, a freezer compartment, or both; a door attached to the cabinet, the door configured to selectively allow entry to the refrigeration compartment, the freezer compartment, or both; a dispenser assembly positioned at the door, the dispenser assembly including a recess extending into the door, the dispenser assembly configured to egress a fluid, ice, or both, toward the recess, the dispenser assembly including a first lighting component positioned behind an external wall; a scanner assembly including a second lighting component, a scanner device, and a targeting device, wherein the scanner device and the targeting device are positioned at an angle between approximately 15 degrees and approximately 90 degrees toward the recess; a proximity sensor; and a controller, the controller communicatively coupled to the scanner assembly, the first lighting component, and the proximity sensor, the controller configured to execute instructions that causes the refrigerator appliance to perform operations, the operations including commanding, at the first lighting component, provision of light toward or from the recess when the targeting device detects a presence of an object at the recess; commanding, at the scanner device, measurement of fidelity of scan data from light reflected from the object at the recess; and commanding, at the second lighting component, provision of light toward the recess after a pre-determined period of commanding measurement of the amount and pattern of light at the scanner device.

32. The refrigerator appliance of any one or more clauses herein, the operations including determining, via the targeting device, the presence of the object at the recess.

33. The refrigerator appliance of any one or more clauses herein, the operations including determining, via the proximity sensor, the presence of the object at the recess.

34. The refrigerator appliance of any one or more clauses herein, wherein the housing includes a casing at which the scanner assembly is positioned, and wherein the housing positions the scanner assembly adjacent along a width direction, a depth direction, or both, to the proximity sensor.

35. The refrigerator appliance of any one or more clauses herein, including a casing at which the scanner assembly is positioned, wherein the casing disposes the scanner device and the targeting device at the angle toward the recess and behind the external wall.

36. The refrigerator appliance of any one or more clauses herein, wherein the pre-determined period of commanding measurement of the amount and pattern of light at the scanner device includes obtaining a pre-determined quantity of partial scans at the scanner device.

37. The refrigerator appliance of any one or more clauses herein, the operations including increasing an intensity of the provision of light from the second lighting component over a period of time.

38. The refrigerator appliance of any one or more clauses herein, the operations including discontinuing provision of light from the second lighting component when a complete scan is obtained at the scanner device.

39. A method for reading a machine-readable code at an object at a refrigerator appliance, the method including providing, from a first lighting component of the refrigerator appliance directed toward or from a recess at a dispenser, light toward the recess when a targeting device or a proximity sensor detects a presence of an object at the recess; measuring, at a scanner device positioned adjacent from the proximity sensor along a width direction, a depth direction, or both, fidelity of scan data from light reflected from the object at the recess; and providing, at a second lighting component adjacent from the scanner device and the proximity sensor along the width direction, the depth direction, or both, light toward the recess after a pre-determined period of commanding measurement of the amount and pattern of light at the scanner device.

40. The method of any one or more clauses herein, including increasing an intensity of the provision of light from the second lighting component over a period of time; and discontinuing provision of light from the second lighting component when a complete scan is obtained at the scanner device.

41. A refrigerator appliance, including a cabinet forming a refrigeration compartment, a freezer compartment, or both; a door attached to the cabinet, the door configured to selectively allow entry to the refrigeration compartment, the freezer compartment, or both; a dispenser assembly positioned at the door, the dispenser assembly including a recess extending into the door, the dispenser assembly configured to egress a fluid, ice, or both, toward the recess; a scanner assembly including a scanner device and a targeting device, wherein the scanner assembly is positioned at a casing disposing the scanner device and the targeting device at an angle toward the recess, wherein the scanner assembly and the targeting device are positioned at an angle toward the recess and behind the external wall; and a sound emitting device positioned outside of the casing at which the scanner assembly is positioned, wherein the sound emitting device is configured to selectively emit sounds based on a command signal from the scanner assembly, the sound emitting device communicatively coupled to the scanner assembly.

42. The refrigerator appliance of any one or more clauses herein, wherein the angle is between approximately 15 degrees and approximately 90 degrees.

43. The refrigerator appliance of any one or more clauses herein, including a housing at which a proximity sensor is positioned, wherein the proximity sensor is directed toward the recess.

44. The refrigerator appliance of any one or more clauses herein, wherein the casing at which the scanner assembly is positioned is positioned at the housing.

45. The refrigerator appliance of any one or more clauses herein, wherein the housing positions the scanner assembly adjacent along a width direction, a depth direction, or both, to the proximity sensor.

46. A refrigerator appliance, including a cabinet forming a refrigeration compartment, a freezer compartment, or both; a door attached to the cabinet, the door configured to selectively allow entry to the refrigeration compartment, the freezer compartment, or both; a dispenser assembly positioned at the door, the dispenser assembly including a recess extending into the door, the dispenser assembly configured to egress a fluid, ice, or both, toward the recess; a scanner assembly including a scanner device and a targeting device, wherein the scanner assembly is positioned at a casing disposing the scanner device and the targeting device at an angle toward the recess and behind the external wall, wherein the scanner assembly and the targeting device are positioned at an angle toward the recess and behind the external wall; a sound emitting device configured to selectively emit sounds based on a command signal from the scanner assembly, the sound emitting device communicatively coupled to the scanner assembly; and a controller communicatively coupled to the scanner assembly and the sound emitting device, the controller configured to execute instructions that causes the refrigerator appliance to perform operations, the operations including commanding provision of light toward or from the recess when the targeting device detects a presence of an object at the recess; commanding, at the scanner device, measuring fidelity of scan data from light reflected from the object at the recess; commanding provision of light toward or from the recess after a pre-determined period of commanding measurement of fidelity of scan data; and transmitting, from the scanner assembly to the sound emitting device, a scanner control signal commanding a scanner sound output when the pre-determined period of commanding measurement of the amount and pattern of light at the scanner device is complete.

47. The refrigerator appliance of any one or more clauses herein, wherein the sound emitting device is positioned outside of the casing at which the scanner assembly is positioned.

48. The refrigerator appliance of any one or more clauses herein, wherein the scanner assembly is communicatively coupled to the sound emitting device via the controller, and wherein transmitting the scanner control signal includes transmitting the scanner control signal from the scanner assembly to the controller and transmitting the scanner control signal from the controller to the sound emitting device.

49. The refrigerator appliance of any one or more clauses herein, the operations including determining, via the targeting device, the presence of the object at the recess.

50. The refrigerator appliance of any one or more clauses herein, wherein the pre-determined period of commanding measurement of the amount and pattern of light at the scanner device includes obtaining a pre-determined quantity of partial scans at the scanner device.

51. The refrigerator appliance of any one or more clauses herein, the operations including increasing an intensity of the provision of light over a period of time.

52. The refrigerator appliance of any one or more clauses herein, the operations including discontinuing provision of light when a complete scan is obtained at the scanner device.

53. The refrigerator appliance of any one or more clauses herein, the operations including transmitting, from the scanner assembly to the sound emitting device, a second control signal commanding a second sound output when the complete scan is obtained at the scanner device.

54. The refrigerator appliance of any one or more clauses herein, wherein the angle is between approximately 15 degrees and approximately 90 degrees.

55. The refrigerator appliance of any one or more clauses herein, including a housing at which a proximity sensor is positioned, wherein the sensor is directed toward the recess.

56. The refrigerator appliance of any one or more clauses herein, wherein the casing at which the scanner assembly is positioned at the housing.

57. The refrigerator appliance of any one or more clauses herein, wherein the housing positions the scanner assembly adjacent along a width direction, a depth direction, or both, to the proximity sensor.

58. The refrigerator appliance of any one or more clauses herein, the operations including determining, via the proximity sensor, the presence of the object at the recess.

59. The refrigerator appliance of any one or more clauses herein, the operations including transmitting, from the proximity sensor to the sound emitting device, a sensor control signal commanding a sensor sound output when the presence of the object at the recess is determined.

60. A method for reading a machine-readable code at an object at a refrigerator appliance, the method including providing, from a lighting component of the refrigerator appliance directed toward or from a recess at a dispenser, light toward the recess when a targeting device or a proximity sensor detects a presence of an object at the recess; scanning, via a scanner device, a machine-readable code at an object at the recess; and transmitting, from the scanner device to a sound emitting device positioned outside of a scanner assembly including the scanner device, a scanner control signal commanding a scanner sound output when a pre-determined period of commanding measurement of fidelity of scan data at the scanner device is complete.

61. A refrigerator appliance in accordance with any one or more clauses herein.

62. A method for reading a machine-readable code in accordance with any one or more clauses herein.

63. A dispenser assembly in accordance with any one or more clauses herein.

64. A refrigerator appliance including the dispenser assembly of any one or more clauses herein.

65. A refrigerator appliance including a controller configured to execute one or more steps of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet forming a refrigeration compartment, a freezer compartment, or both;
a door attached to the cabinet, the door configured to selectively allow entry to the refrigeration compartment, the freezer compartment, or both;
a dispenser assembly positioned at the door, the dispenser assembly comprising a recess extending into the door, the dispenser assembly configured to egress a fluid, ice, or both, toward the recess; and
a casing at which a scanner assembly comprising a scanner device, a targeting device, and a light assembly is positioned, wherein the casing disposes the scanner device and the targeting device at an angle extended from a depth direction, the angle between approximately 15 to 90 degrees toward the recess, wherein the casing is positioned behind an external wall forming an interior volume of the dispenser assembly and separating the interior volume from an exterior volume outside of the refrigerator appliance, the casing positioned in the interior volume such that the scanner device is positioned inward along the depth direction from the external wall.

2. The refrigerator appliance of claim 1, comprising:
a housing at which a sensor is positioned, wherein the sensor is directed toward the recess.

3. The refrigerator appliance of claim 2, wherein the housing positions the scanner assembly adjacent along a width direction, the depth direction, or both, to the sensor.

4. The refrigerator appliance of claim 3, wherein the dispenser assembly comprises an outlet opening configured to egress the fluid, the ice, or both, toward the recess, and wherein the housing positions the scanner assembly above the outlet opening.

5. The refrigerator appliance of claim 2, wherein the sensor is a proximity sensor.

6. The refrigerator appliance of claim 1, comprising:
a housing at which a separator wall is positioned, wherein the separator wall is disposed between the scanner device and the recess.

7. The refrigerator appliance of claim 6, wherein the separator wall forms a prism or mirror.

8. The refrigerator appliance of claim 1, comprising:
a housing at which a separator wall is positioned, wherein the separator wall is configured to diffuse light from the scanner assembly.

9. A dispenser assembly for a refrigerator appliance, comprising:
a first lighting component positioned behind an external wall, the first lighting component configured to illuminate a recess formed at the dispenser assembly; and
a casing at which a scanner assembly comprising a scanner device, a targeting device, and a second lighting component is positioned, wherein the casing disposes the scanner device and the targeting device at an angle extended from a depth direction, the angle between approximately 15 to 90 degrees toward the recess, wherein the casing is positioned behind an external wall forming an interior volume of the dispenser assembly and separating the interior volume from an exterior volume outside of the refrigerator appliance, the casing positioned in the interior volume such that the scanner device is positioned inward along the depth direction from the external wall.

10. The dispenser assembly of claim 9, comprising:
a housing at which a proximity sensor is positioned.

11. The dispenser assembly of claim 10, wherein the housing positions the scanner assembly adjacent along a width direction, the depth direction, or both, to the sensor.

12. The dispenser assembly of claim 11, wherein the dispenser assembly comprises an outlet opening through which a fluid nozzle extends toward the recess, and wherein the housing positions the scanner assembly above the outlet opening.

13. The dispenser assembly of claim 9, comprising:
a housing at which a separator wall is positioned, wherein the separator wall is disposed between the scanner device and the recess.

14. The dispenser assembly of claim 13, wherein the separator wall forms a prism or mirror.

15. The dispenser assembly of claim 9, comprising:
a housing at which a separator wall is positioned, wherein the separator wall is configured to diffuse light from the scanner assembly.

* * * * *